United States Patent [19]

Ruderer et al.

[11] Patent Number: 5,306,674
[45] Date of Patent: Apr. 26, 1994

[54] LEAD-FREE GLASS COATINGS

[75] Inventors: Clifford G. Ruderer, Pittsburgh, Pa.; Gordon J. Roberts, Parma, Ohio; Hasan B. Emlemdi, Pittsburgh, Pa.

[73] Assignee: Ferro Corporation, Cleveland, Ohio

[21] Appl. No.: 939,520

[22] Filed: Sep. 4, 1992

[51] Int. Cl.$^5$ .................. C03C 3/066; C03C 8/04; C03C 8/14

[52] U.S. Cl. .................. 501/70; 501/21; 501/17; 501/79; 501/26; 427/419.4; 427/376.2

[58] Field of Search ............ 501/79, 17, 21, 20, 501/26; 427/419.4, 376.2

[56] References Cited

U.S. PATENT DOCUMENTS

| | | | |
|---|---|---|---|
| 2,409,412 | 10/1946 | Armistead, Jr. | 501/904 |
| 3,726,698 | 4/1973 | Hares et al. | 106/54 |
| 3,743,417 | 7/1973 | Smatlak | 355/125 |
| 4,043,824 | 8/1977 | Wagar | 106/48 |
| 4,196,004 | 4/1980 | Berretz | 106/48 |
| 4,446,241 | 5/1984 | Francel et al. | 501/14 |
| 4,537,862 | 8/1985 | Francel et al. | 501/14 |
| 4,752,460 | 6/1988 | Herren | 423/593 |
| 4,822,396 | 4/1989 | Reinherz et al. | 65/60.7 |
| 4,828,596 | 5/1989 | Reinherz | 65/24 |
| 4,859,637 | 8/1989 | Roberts | 501/79 |
| 4,892,847 | 1/1990 | Reinherz | 501/14 |
| 4,902,734 | 2/1990 | Dexter et al. | 524/91 |
| 4,937,063 | 6/1990 | Sullivan | 423/593 |
| 4,959,090 | 9/1990 | Reinherz | 65/60.4 |
| 4,970,178 | 11/1990 | Klimas et al. | 501/26 |
| 4,983,196 | 1/1991 | Stotka | 65/24 |
| 4,997,687 | 3/1991 | Carter | 428/34 |
| 5,030,503 | 7/1991 | Carter et al. | 428/195 |

FOREIGN PATENT DOCUMENTS

| | | |
|---|---|---|
| 156327 | 5/1954 | Australia . |
| 238302 | 6/1960 | Australia . |
| 248836 | 6/1960 | Australia . |
| 722066 | 12/1967 | Australia . |
| 1749588 | 6/1988 | Australia . |
| 0321297 | 6/1989 | European Pat. Off. . |
| 0370683 | 5/1990 | European Pat. Off. . |
| 0444821 | 9/1991 | European Pat. Off. . |
| 2122481 | 9/1972 | France . |
| 8905781 | 6/1989 | PCT Int'l Appl. . |
| 9015782 | 12/1990 | PCT Int'l Appl. . |
| 2072159 | 9/1981 | United Kingdom . |

OTHER PUBLICATIONS

Chemical Abstracts, vol. 106, No. 6, Feb. 1987, (Columbus, Ohio), p. 289, Abstract 37474r.

*Primary Examiner*—Mark L. Bell
*Assistant Examiner*—C. M. Bonner
*Attorney, Agent, or Firm*—Rankin, Hudak & Hill

[57] ABSTRACT

This invention relates to a lead-free glass coating made by firing a lead-free glass enamel composition comprising a glass frit having by weight from about 20% to about 40% zinc oxide, from about 20% to about 32% boron oxide, and from about 10% to about 30% silicon dioxide, from about 0% to about 12% titanium dioxide, from about 4% to about 12% sodium oxide, from about 0% to about 10% potassium oxide, from about 0% to about 12% zirconia, up to about 4% alumina, up to about 5% lithium and up to about 5% fluorine. The lead-free glass coating exhibits excellent adhesion and improved acid resistance.

16 Claims, No Drawings

5,306,674

LEAD-FREE GLASS COATINGS

FIELD OF THE INVENTION

This invention relates to lead-free glass enamels and glazes. More particularly, this invention concerns lead-free glass enamels and glazes for decorating or coating glass structures, such as automotive glass, appliance glass, architectural spandrels, beverage containers, lighting bulbs and fixtures and other glass objects.

BACKGROUND OF THE INVENTION

Lead containing glazes and enamels for glass substrates are well-known in the ceramic art. A glaze is typically thought of as a clear glass coating, whereas an enamel is a glaze which contains a pigment or other particles in suspension. Such glazes and enamels often are applied to glass surfaces in the form of a paste, the paste containing finely ground particles of glassy material, commonly called "frit" and a vehicle. After application of the glaze or enamel to the glass surface by silk screening or other techniques, the glass is fired to volatilize and/or thermally decompose and drive off the vehicle, fuse the frit, and bond the glaze or enamel to the glass surface.

In the past, the use of lead oxide in the frit served to lower the melting point of the frit. Recently, efforts have been made to retain the low melt temperature of the glazes and enamels without the use of lead.

An example of a prior art lead-free glass enamel may be found in Roberts, U.S. Pat. No. 4,859,637. Roberts discloses a lead-free glass enamel including a frit having in weight percent 19-45% $SiO_2$, 20-33% $B_2O_3$, 8-15% alkali metal oxide, 0-35% ZnO, 0-10% $ZrO_2$, 0-6% $Al_2O_3$, 0-3% BaO, 0-8% $P_2O_5$, 0-6% $La_2O_3$, 2-10% $F_2$, and 2-25% of a U.V. additive.

Another example of a prior art lead-free glass enamel may be found in Francel et al., U.S. Pat. No. 4,537,862. Francel et al. discloses a glass enamel including a frit comprising by weight 25-32% $SiO_2$, 25-32% $B_2O_3$, 10-18% $ZrO_2$, 0-9% $Na_2O$, 0-5% $K_2O$, 0-9% $Li_2O$, 0-2% $SnO_2$, 0-3% $F_2$, 0-3% CaO, 0-6% SrO, and 10-18% rare earth oxide wherein the ratio of $ZrO_2$ to rare earth oxide is about 1:1 to 1.4:1, the amount of $ZrO_2$ plus rare earth oxide is about 20% to 33% and the amount of $Li_2O$, $K_2O$ and $Na_2O$ is about 1 to 10.

SUMMARY OF THE INVENTION

The present invention provides a new and improved lead-free glass enamel or glaze that exhibits good adhesion, good acid resistance and is capable of being manufactured at a reasonable cost.

In one preferred embodiment the invention provides a lead-free glass enamel or glaze which includes a lead-free glass or frit composition comprising by weight from about 22% to about 27% zinc oxide (ZnO), from about 22% to about 28% boron oxide ($B_2O_3$), and from about 20% to about 25% silicon dioxide ($SiO_2$), from about 4% to about 7% titanium dioxide ($TiO_2$), from about 6% to about 8% sodium oxide ($Na_2O$), from about 3% to about 6% potassium oxide ($K_2O$), from about 6% to about 10% zirconia ($ZrO_2$), up to about 2% alumina ($Al_2O_3$), up to about 1% lithium oxide ($Li_2O$) and up to about 2% fluorine ($F_2$). Also, preferably such glass or frit contains less than about 5% barium oxide (BaO), and less than 2% by weight each of calcium oxide (CaO), strontium oxide (SrO) and magnesium oxide (MgO).

In another aspect of the invention there is provided a lead-free glass-coating made by firing the composition described above at a temperature of from about 1100° F. to about 1300° F. for a period of from about 3 to about 7 minutes.

The foregoing and other features of the invention are hereinafter more fully described and particularly pointed out in the claims. The following description sets forth in detail certain illustrative embodiments of the invention, those being indicative, however, of but a few of the various ways in which the principles of the invention may be employed.

DETAILED DESCRIPTION

This invention relates to a glass enamel or glaze system including a lead-free glass frit possessing not only a moderately low coefficient of thermal expansion but also possessing maturation temperatures which are similar to those of widely used lead-containing frits and which are sufficiently low to permit their use under firing conditions commonly used by the glass decorating industries. The chemical durability of the glass enamel or glaze is also significantly improved relative to previous lead-free glazes and glass enamels possessing the above characteristics. Additionally, the cost of the raw materials utilized in the production of glass enamels or glazes made in accordance with the present invention is significantly less than that of lead-free glass enamels which achieve a low maturation temperature by the inclusion of bismuth oxide ($Bi_2O_3$).

Glass enamels and glazes made in accordance with the present invention find commercial utility in such applications as coatings for automotive glass, appliance glass, architectural spandrels, beverage containers, lighting bulbs and fixtures and other glass objects.

This invention also provides for a method of decorating glass substrates by the application of a glass frit made according to this invention to a glass substrate and subsequent firing resulting in a lead-free glass coating.

The glass enamel or glaze made in accordance with the present invention contains less than about 1% by weight lead oxide (PbO), preferably less than about 0.75% by weight lead oxide, and more preferably less than about 0.5% by weight lead oxide. Even further preferred, the glass enamel or glaze contains less than about 0.05% by weight lead oxide. As used in this specification and the claims below the term "lead-free" means no intentional addition of lead or lead oxide and less than 0.5% by weight lead oxide.

The moderate maturation temperature of the glazes and enamels of this invention minimizes thermal damage or distortion to the underlying glass during firing. Also, the coefficient of thermal expansion of these systems (from about $65 \times 10^{-7}$ cm/cm° C. to about $90 \times 10^{-7}$ cm/cm° C.) is such that excessive stresses are avoided between the glaze or enamel layer and the glass substrate.

The glaze or enamel of the present invention preferably matures and is compatible with a relatively fast fire at from about 1050 F to about 1350° F., preferably from about 1100° F. to about 1300° F., and more preferably from about 1150° F. to about 1250° F., for a relatively brief period, that is, preferably from about 1 to about 15 minutes, preferably from about 2 to about 10 minutes, and more preferably from about 3 to about 7 minutes. Unless otherwise indicated, temperatures referred to herein are firing temperatures, that is to say the temperature of the oven.

The glass frit of the present invention can be melted in sintered fused silica crucibles at about 2190°-2282° F. with little attack on the crucible, though melting time must be controlled somewhat closely because of fluorine loss and will vary according to the size of the batch. A preferred time for a 500 gm batch may be about 25 to about 30 minutes, while a preferred time for a 1 kg batch of the same composition may be about 55 to about 65 minutes. The melt may be handled by any suitable means though typically it is quenched by steel rolls into flake, using techniques well-known to those skilled in the art.

This invention relates to a lead-free glass frit comprising the following compositions:

| Component | Range (Wt. %) | Preferred Range (Wt. %) | More Preferred Range (Wt. %) |
|---|---|---|---|
| ZnO | 20-40 | 20-35 | 22-27 |
| $B_2O_3$ | 20-32 | 22-29 | 22-28 |
| $SiO_2$ | 10-30 | 15-28 | 20-25 |
| $TiO_2$ | 0-12 | 2-8 | 4-7 |
| $Na_2O$ | 4-12 | 6-11 | 6-8 |
| $K_2O$ | 0-10 | 1-8 | 3-6 |
| $ZrO_2$ | 0-12 | 4-11 | 6-10 |
| $Al_2O_3$ | 0-4 | 0-3 | 0-2 |
| $Li_2O$ | 0-5 | 0-2 | 0-1 |
| BaO | 0-10 | 0-8 | 0-5 |
| CaO | 0-5 | 0-3 | 0-2 |
| SrO | 0-5 | 0-3 | 0-2 |
| MgO | 0-5 | 0-3 | 0-2 |
| $F_2$ | 0-5 | 0-4 | 0-2 |

In order to ensure that the glass enamel displays sufficient chemical durability the glass frit includes a combined weight of $ZrO_2$ plus $TiO_2$ of at least about 10% by weight, preferably at least about 12% by weight $ZrO_2$ plus $TiO_2$, and more preferably at least about 14% by weight $ZrO_2$ plus $TiO_2$. Also, in order to prevent the glass enamel from becoming too "refractory," resulting in poor adhesion, the glass frit includes a combined weight of MgO plus CaO plus SrO plus BaO of less than about 15% by weight, preferably less than about 12% by weight and more preferably less than about 10% by weight. The glass frit contains less than about 5% by weight bismuth oxide ($Bi_2O_3$), preferably less than about 3% by weight bismuth oxide, and more preferably less than about 1% by weight bismuth oxide. Even more preferred, the glass frit is substantially free of bismuth oxide.

Further, in order to prevent the glass enamel from becoming too "refractory" the glass frit contains a combined weight of less than about 10% by weight cerium oxide ($CeO_2$) plus manganese oxide ($MnO_2$) plus iron oxide ($Fe_2O_3$) plus cobalt oxide (CoO) plus copper oxide (CuO) plus vanadium oxide ($V_2O_5$) plus molybdenum oxide ($MoO_3$). Preferably, the glass frit contains less than about 5% by weight $CeO_2$ plus $MnO_2$ plus $Fe_2O_3$ plus CoO plus CuO plus $V_2O_5$ plus $MoO_3$. More preferably, the glass frit contains less than about 2% by weight $CeO_2$ plus $MnO_2$ plus $Fe_2O_3$ plus CoO plus CuO plus $V_2O_5$ plus $MoO_3$.

The glass enamels are made according to the following technique. Glass frits, in flake or granular form, are ball-milled with water to an average particle size of about 3 to about 8 microns as measured on a Microtrac at the 50% level dried, and blended with a conventional cold paste vehicle (e.g., a vehicle based on glycol ether acetate). It will be appreciated that the present invention contemplates the use of various vehicles, the particular vehicle generally being a function of the particular application technique employed. Such vehicles include, for example, UV curable vehicles, water miscible vehicles, thermoplastic vehicles, hot melt vehicles, spray vehicles and roll coat vehicles.

Pigments, other glass frits, fillers and other additives may be included in the glass enamel. The glass enamel comprises by weight from about 30% to about 90% glass frit as set forth above from about 3% to about 40% vehicle and up to about 40% pigment and other glass frits and fillers. Preferably, the glass enamel comprises by weight from about 35% to about 85% glass frit as set forth above, from about 4% to about 35% vehicle and up to about 35% pigment and other glass frits and fillers. More preferably, the glass enamel comprises by weight from about 40% to about 80% glass frit as set forth above, from about 5% to about 35% vehicle and up to about 30% pigment and other glass frits and fillers.

The resulting ink composition may be screen-printed or otherwise applied on the glass substrates by methods known in the art and then fired to produce an enamel finish (or glaze when no pigment is used) on the surface of the substrate.

An enamel finish produced in accordance with the principles of the present invention exhibits good acid resistance. Specifically, utilizing the procedures set forth in ASTM test procedure C724-88, the enamel finish exhibits better than a Grade 7 degree of attack (i.e., complete removal of enamel in exposed area). Preferably, the enamel finish displays at least a Grade 6 degree of attack (i.e., significant removal of enamel with pin holing) pursuant to ASTM test procedure C724-88 and more preferably at least a Grade 5 degree of attack (i.e., surface dull or matte with chalking possible).

Utilizing the grading procedures set forth in ASTM test procedure C724-88, but immersing the glass enamel in a 4% acetic acid solution for a period of one minute, the enamel finish exhibits at least a Grade 5 degree of attack (i.e., surface dull or matte with chalking possible). Preferably, the enamel finish utilizing the 4% acetic acid solution and a one minute immersion displays at least a Grade 4 degree of attack (i.e., definite stain with a gross color change or strongly iridescent surface visible at angles less than 30 and which may blur reflected images).

By way of illustration and not by any limitation, the following examples will describe a specific glass enamel composition and a method of using such enamel composition, which method and composition are within the scope of the present invention. As with the text above and the claims below, unless otherwise indicated, all parts and percentages are by weight, and all temperatures are in degrees Fahrenheit.

EXAMPLE 1

A glass enamel composition is prepared by first ball milling a glass frit having the composition set forth below in a water solution until a particle size of about 3 microns to about 8 microns, as determined by a Microtrac at a 50% level, is achieved.

| | Glass Frit | |
|---|---|---|
| Component | | % Weight |
| ZnO | | 23 |

-continued

| Glass Frit | |
|---|---|
| Component | % Weight |
| $B_2O_3$ | 27 |
| $SiO_2$ | 25 |
| $Na_2O$ | 6 |
| $K_2O$ | 6 |
| $ZrO_2$ | 8 |
| $TiO_2$ | 4.5 |
| $Li_2O$ | 0.5 |
| $F_2$ | 0 |
| BaO | 0 |
| CaO | 0 |
| SrO | 0 |
| MgO | 0 |

After milling, the particles of glass frit are dried. The dried particles are blended in order to provide an enamel having the following composition.

| Glass Enamel | |
|---|---|
| Component | % Weight |
| Glass Frit | 66.0 |
| Pigment | 16.2[1] |
| Vehicle | 17.8[2] |

[1] K-393-2 CuCrMn pigment available from Ferro Corporation of Cleveland, Ohio.
[2] C-67 Vehicle available from Ferro Corporation.

EXAMPLE 2

The glass enamel composition of Example 1 is applied to a glass substrate to a thickness of about 1 to 2 mils using conventional screen printing techniques. The coated glass substrate is then fired at 1200° F. for five minutes. The coated glass substrate is then cooled to room temperature. The process Yields a tenacious enamel finish on the surface of the glass substrate which finish displays at least a Grade 6 result under ASTM test procedure C724-88 and at least a Grade 5 result utilizing a one minute immersion of the glass enamel in a 4% acetic solution.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A lead-free glass enamel composition comprising a lead-free glass frit having in percent by weight from about 22% to about 27% ZnO, from about 22% to about 28% $B_2O_3$, from about 20% to about 25% $SiO_2$, from about 4% to about 7% $TiO_2$, from about 6% to about 8% $Na_2O$, from about 3% to about 6% $K_2O$, from about 6% to about 10% $ZrO_2$, up to about 2% $Al_2O_3$, up to 5% BaO, up to 1% $Li_2O$, up to 2% $F_2$, substantially no CaO, SrO and MgO, with a combined weight of $ZrO_2$ plus $TiO_2$ being at least about 10% and the combined weight of MgO plus CaO plus SrO plus BaO being less than about 15%.

2. A lead-free glass enamel composition comprising a lead-free frit having in percent by weight from about 20% to about 35% of zinc oxide (ZnO), from about 2% to about 28% of boron oxide ($B_2O_3$), from about 20% to about 25% of silicon dioxide ($SiO_2$), from about 4% to about 7% of titanium dioxide ($TiO_2$), from about 6% to about 11% sodium oxide ($Na_2O$), from about 1% to about 8% potassium oxide ($K_2O$), from about 4% to about 11% zirconium dioxide ($ZrO_2$), up to 3% alumina ($Al_2O_3$), up to about 8% barium oxide (BaO), up to about 5% of each of lithium oxide ($Li_2O$), calcium oxide (CaO), strontium oxide (SrO), magnesium oxide (MgO) and fluorine ($F_2$) and the combined weight of MgO plus CaO plus SrO plus BaO being less than about 15%.

3. The enamel composition of claim 1 wherein said glass frit combined weight of $ZrO_2$ plus $TiO_2$ is at least about 12% by weight and the combined weight of MgO plus SrO plus BaO is less than bout 12% by weight.

4. The enamel composition of claim 1, wherein said glass frit includes a combined weight of $ZrO_2$ plus $TiO_2$ of at least about 14% by weight, up to about 2% by weight each of CaO, SrO and MgO, and a combined weight of MgO plus CaO plus SrO plus BaO of less than about 10% by weight.

5. The enamel composition of claim 1 wherein said glass frit includes in weight percent from about 22% to about 27% ZnO, from about 22% to about 28% $B_2O_3$, and up to about 5% BaO.

6. The enamel composition of claim 1 wherein said glass enamel composition comprises by weight from about 40% to about 80% said glass frit, from about 5% to about 35% vehicle and up to about 30% pigment.

7. The enamel composition of claim 1 wherein a coating formed by said enamel composition displays a Grade 6 or better result under ASTM test procedure C724-88.

8. The enamel composition of claim 1 wherein a coating formed by said enamel composition displays a dull or matte appearance with possible chalking after said coating has been immersed in a 4% acetic acid solution for a period of one minute.

9. The enamel composition as set forth in claim 1 wherein said glass frit comprises less than about 1% by weight $Bi_2O_3$ and a combined weight of $CeO_2$, $MnO_2$, $Fe_2O_3$, CoO, CuO, $V_2O_5$ and $MoO_3$ is less than about 2% by weight.

10. A method of decorating a substrate comprising the following steps:
   A. providing a glass enamel composition comprising a lead-free glass frit comprising in weight percent from about 20% to about 25% ZnO, from about 22% to about 28% $B_2O_3$, from about 20% to about 25% $SiO_2$, from about 4% to about 7% $TiO_2$, from about 6% to about 11% $Na_2O$, from about 1% to about 8% $K_2O$, from about 4% to about 11% $ZrO_2$, up to about 3% $Al_2O_3$, up to about 5% BaO, up to about 1% $Li_2O$, up to about 4% $F_2$, substantially no CaO, SrO and MgO, and the combined weight of MgO plus CaO plus SrO plus BaO being less than about 15%;
   B. applying such glass enamel composition to such substrate to form a coated substrate; and
   C. firing such coated substrate at a temperature of from about 1050° F. to about 1350° F.

11. A method of decorating a substrate comprising the following steps:
   A. providing a glass enamel comprising a glass frit including in weight percent from about 20% to about 35% ZnO, from about 22% to about 29% $B_2O_3$, from about 15% to about 28% $SiO_2$, from about 4% to about 7% $TiO_2$, from about 6% to about 11% $Na_2O$, from about 1% to about 8% $K_2O$, from about 4% to about 11% $ZrO_2$, up to about 3% $Al_2O_3$, up to about 2% $Li_2O$, up to about 8% BaO, up to about 3% of each of CaO, SrO, MgO, and $F_2$, less than about 1% PbO, wherein $ZrO_2$ plus $TiO_2$ is at least about 14% and the combined weight of MgO, CaO, SrO, and BaO is less than about 10%;

B. applying such glass enamel to such substrate to form a coated substrate; and

C. firing such coated substrate at a temperature of from about 1050° F. to about 1350° F.

12. A method as set forth in claim 11 wherein during said step C such coated substrate is fired at a temperature from about 1100° F. to about 1300° F. and such glass frit is lead-free.

13. A method as set forth in claim 11 wherein during said step C such coated substrate is fired at a temperature of from about 1150° F. to about 1250° F. and such glass frit includes less than about 5% BaO.

14. A method as set forth in claim 11 wherein such glass enamel comprises in weight percent from about 30% to about 90% such glass frit, from about 3% to about 40% vehicle, and up to about 40% pigment, additional glass frits and fillers.

15. A method as set forth in claim 11 wherein such glass enamel composition comprises in weight percent from about 35% to about 85% such glass frit, from about 4% to about 35% vehicle, and up to about 35% pigment, additional glass frits and fillers.

16. A method as set forth in claim 11 wherein such glass enamel composition comprises in weight percent from about 40% to about 80% such glass frit, from about 5% to about 35% vehicle and up to about 30% pigment and other glass frits and fillers.

* * * * *